Dec. 7, 1926.　　　　　　　　　　　　　　　　1,609,946
G. B. HILL
SPRING MOUNTING FOR VEHICLE FRAMES
Filed August 4, 1923　　　2 Sheets-Sheet 1
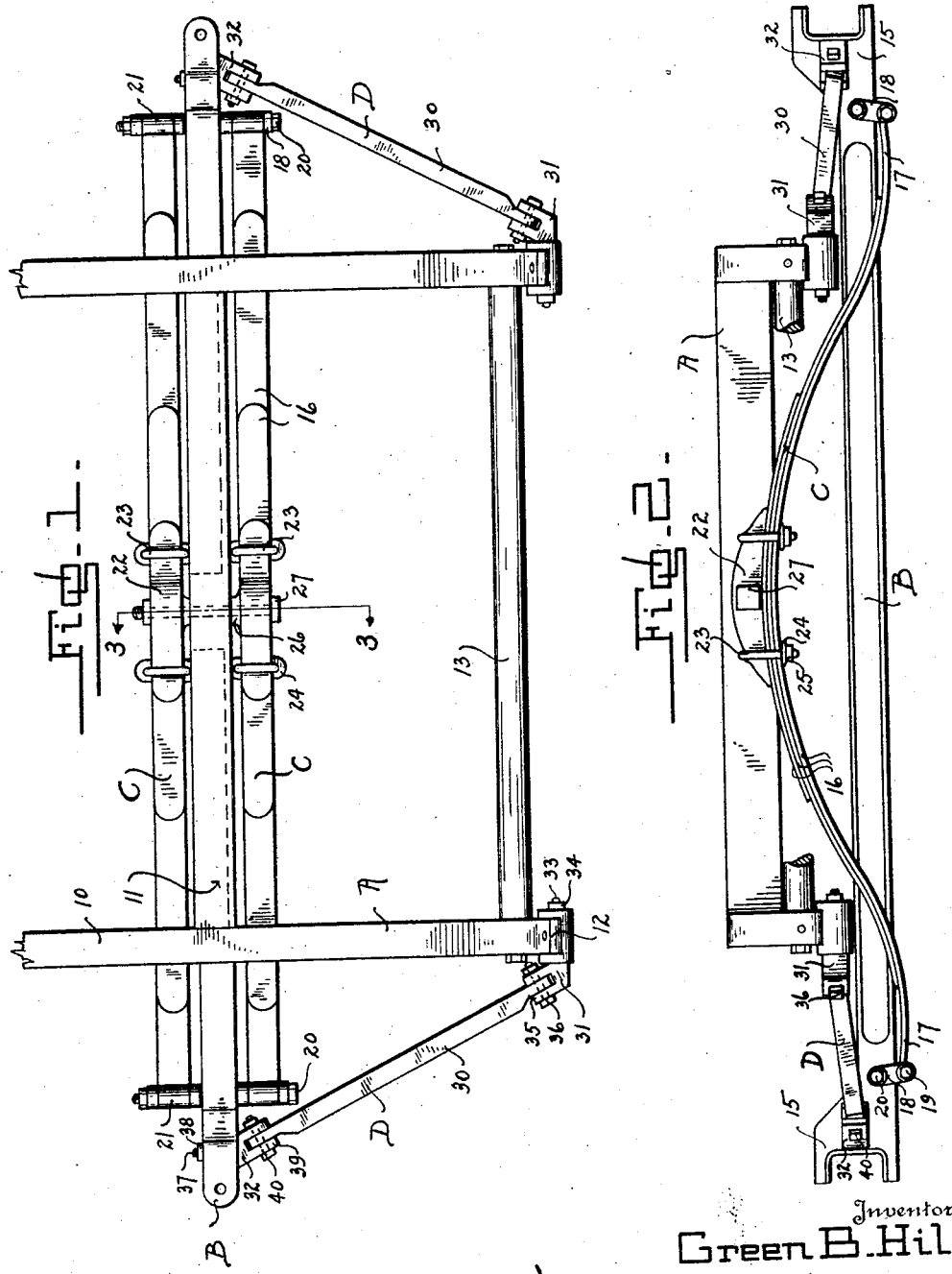
Inventor
Green B. Hill
By Lancaster and Allwine
Attorneys Dec. 7, 1926.  
G. B. HILL  
1,609,946  
SPRING MOUNTING FOR VEHICLE FRAMES  
Filed August 4, 1923    2 Sheets-Sheet 2
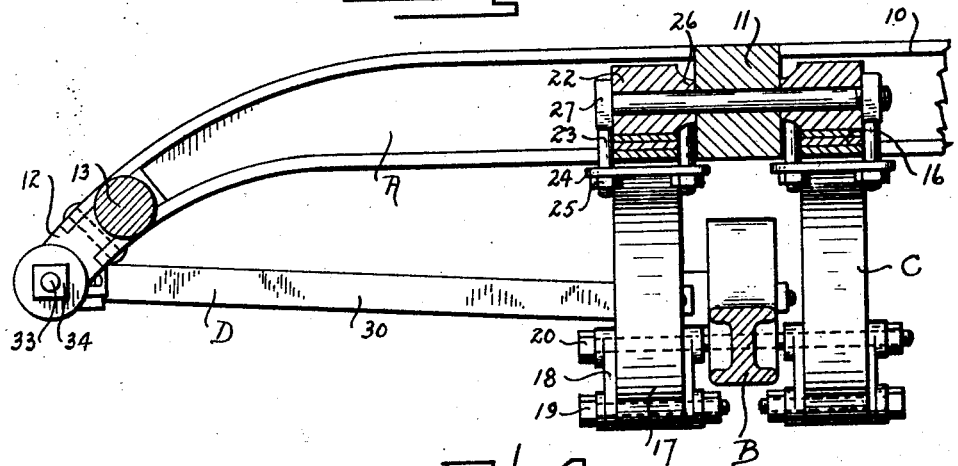
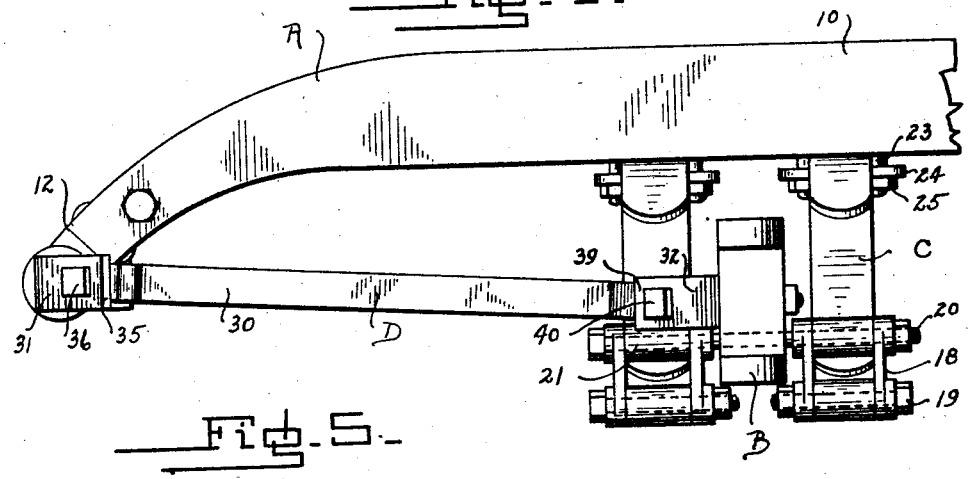
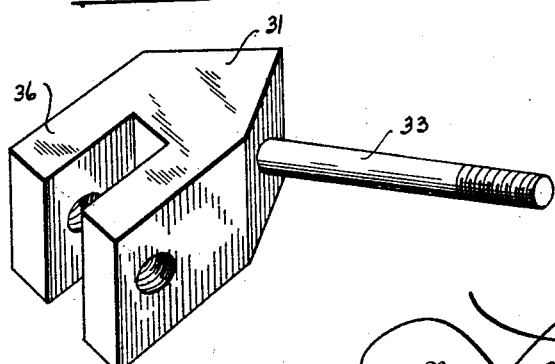
Inventor  
Green B. Hill  
By Lancaster and Allwine  
Attorney Patented Dec. 7, 1926.

1,609,946

UNITED STATES PATENT OFFICE.

GREEN B. HILL, OF BENTON, ILLINOIS.

SPRING MOUNTING FOR VEHICLE FRAMES.

Application filed August 4, 1923. Serial No. 655,737.

This invention relates to spring mountings for vehicle frames, and more particularly to front running gears of motor vehicles, being well adapted for use in connection with vehicles utilizing a three point suspension for the frame thereof.

As most vehicles are now constructed, little or no provision is made for an equal distribution of the weight of the cars on the frames, spring and axles, when traversing rough and uneven roadways, thereby subjecting them to excessive strain and often distorting or completely breaking parts of the vehicles.

The principal objects of the present invention are, first to overcome the above mentioned disadvantages and objections by providing spring mountings for vehicle frames which will effectively equalize the weight of the vehicles on the frames, springs and axles, regardless of uneven roadways or obstacles that might be encountered in the course of travel; to prevent all twisting of the frames and axles and obviate the liability of tipping over; and, to provide novel means which will effectively prevent forward or rearward movement of the front axles, at the same time allowing them to move freely in a vertical position when required.

Other objects and advantages will appear in the following detailed description, taken in connection with the accompanying drawings, forming a part of this specification and in which drawings:

Figure 1 is a plan view of my invention applied to the forward end of a vehicle frame.

Figure 2 is a front elevation thereof.

Figure 3 is an enlarged longitudinal sectional view, taken on the line 3—3 of Figure 1.

Figure 4 is a side elevation on an enlarged scale of the device as shown in Figure 1; and Figure 5 is a detail perspective view of an element of the invention.

In the drawings, wherein for the purpose of illustration is shown the preferred embodiment of my invention and wherein similar reference characters designate corresponding parts throughout the several views, the letter A indicates a vehicle frame; B, a front axle; C springs carried by the axle B and upon which is mounted the frame A; and D, means connecting the frame A and axle B for preventing forward or rearward movement of the axle B.

The frame A may be of the ordinary construction including a pair of spaced channeled side rails 10 and a cross rail 11. The forward ends of the side rails 10 preferably project beyond the cross rail 11 being of arcuate formation and providing horns 12, said horns being held in spaced relation by means of a bar 13, secured in any approved manner, and which also serves as a bumper for the forward end of the vehicle.

The axle B, which may be of any approved style or construction, extends transversely and beneath the frame A. As is customary, the outer ends 15 extend beyond the side rails 10 and are adapted to carry the wheels (not shown) in the usual manner.

Referring now to the springs C, which are positioned on opposite sides of the cross rail 11 and in vertical planes parallel therewith, they preferably are of the semi-elliptical type, being made up of a plurality of leaves 16. Each end 17 of the lowermost and longest of the leaves 16 is formed with an eye and positioned between shackle plates 18, being pivotally secured thereto by means of a pin or bolt 19 passing thru the plates 18 and eye in the end 17 of the spring C. These shackle plates 18 are transversely aligned on opposite sides of the axle B, and are pivotally connected to said axle by means of a bolt or pin 20 extending therethrough preferably adjacent the ends 15 thereof. By mounting the spring C as closely as possible to the ends 15 of the axle B, relatively long springs may be used, which greatly adds to the easy riding qualities of the vehicles. If desired, spacing collars 21 may be employed between each pair of shackle plates 18. Substantially midway of the ends 17 of each spring C is mounted a block 22, the under surface of which is curved to conform to the arcuation of the leaves 16 upon which it rests, and is secured thereto by means of spring clips 23, said clips being substantially U-shaped and having the free ends thereof extending through perforations in a plate 24 and secured as by nuts 25 threaded onto the ends. The inner or confronting faces of the block 22 may be provided with bosses 26 thereby holding said springs in spaced relation from the cross rail 11 and preventing the clips 23 from binding on the sides of the cross rail 11 when the springs C are flexed. These blocks 22 are centrally pivoted to the cross arm 11 on opposite sides thereof by means of a bolt 27 extending thru transversely aligned openings in the blocks 22 and cross rail 11.

Referring now to the means D for preventing movement of the axle B longitudinally of the frame A, it preferably comprises links or rods 30 pivotally secured to the frame A and axle B by blocks 31 and 32 respectively. Each block 31 may be secured to the frame A by having a stem 33 formed thereon extending thru an opening in the front horns 12 and having a nut 34 threaded onto the end thereof. Each block 31 is bifurcated at its outer end, thereby providing spaced ears 35, between which is pivoted the one end of the link 30 by means of a pin 36. The blocks 32 may be secured to the axle B adjacent the ends 15 thereof by means of a stem 37 extending thru the axle B and held by a nut 38 threaded onto the end thereof. Each of the blocks 32 may also be bifurcated and provide spaced ears 39 between which the opposite end of the link 30 is pivoted by means of a bolt 40.

In operation, with a vehicle frame mounted as above described, it will be evident that when an irregularity in the road is encountered, due to the springs C being centrally pivoted to the frame A and pivoted at their ends by means of shackles to the axle B, the frame will be caused to swing or oscillate on the springs C, thereby equally distributing the weight of the vehicle on the wheels. It will also be apparent that the frame A may readily remain in a horizontal plane, while either end of the axle B may raise or lower when striking an obstacle or depression in the roadway, due to the springs C being pivotally secured to the cross rail 11 of the frame A. By such a construction, all twisting or breaking of the frame, and axle will be prevented. The links 30 being pivotally connected to the frame A and axle B will allow the axle to move transversely with respect to the frame, but prevent longitudinal movement, either forwardly or rearwardly. When movement is imparted to the rear wheels by a motor and hence through the frame of the car to the front axle, these links will have the effect of pulling the axle forwardly, and when backing the vehicle will act as struts and have the effect of pushing the axle rearwardly, altho the main function is to assist in holding the axle in proper position with respect to the frame, and allowing free transverse action of the axle.

From the foregoing description, it can be seen that a front frame mounting for a three point suspension of vehicles has been provided, which will effectively allow the frame to move freely respective to the axle or the axle with respect to the frame, without distorting or breaking any of the parts of the vehicle.

Changes in details may be made to the form of invention herein shown and described, without departing from the spirit of the invention or scope of the claims.

I claim:

1. A vehicle frame construction comprising in combination, a pair of laterally spaced side rails, a transverse cross rail connecting said side rails at a point spaced rearward from the forward ends thereof, an axle spaced in longitudinal relation to and directly beneath said cross rail and having its ends extending beyond the side rails, semi-elliptic springs having their intermediate portions connected to said cross rail and having their ends connected to said axle at points adjacent opposite ends thereof, and drag links pivotally connected at their rear ends to opposite projecting ends of said axle outside of the connection of said springs therewith and extending forward in converging relation and pivotally connected at their forward ends to the forward terminals of said side rails.

2. A vehicle frame construction comprising in combination, a pair of longitudinal spaced side rails, a transverse cross rail connecting said side rails at a point spaced rearward from the forward ends thereof, an axle spaced in longitudinal relation beneath said cross rail and having its ends extending beyond the side rails, spring devices connecting said cross rail and axle for permitting relative movement thereof in a vertical direction, and drag link members pivotally connected at one end to said axle and at their opposite ends to portions of the side rails at points forwardly of the axle.

3. In a motor vehicle chassis, the combination with the body frame and front axle thereof, the frame extending forwardly above the axle, of spring means directly and pivotally connected to said frame and axle, and drag links pivotally connected to the forward portion of said frame and to said axle.

GREEN B. HILL.